(12) United States Patent
Jung

(10) Patent No.: US 7,732,091 B2
(45) Date of Patent: Jun. 8, 2010

(54) LITHIUM ION SECONDARY BATTERY

(75) Inventor: Sangseok Jung, Yongin-si (KR)

(73) Assignee: Samsung SDI Co., Ltd., Suwon-si (KR)

(*) Notice: Subject to any disclaimer, the term of this patent is extended or adjusted under 35 U.S.C. 154(b) by 497 days.

(21) Appl. No.: 11/678,867

(22) Filed: Feb. 26, 2007

(65) Prior Publication Data

US 2007/0202396 A1 Aug. 30, 2007

(30) Foreign Application Priority Data

Feb. 28, 2006 (KR) .................. 10-2006-0019431

(51) Int. Cl.
*H01M 2/08* (2006.01)
(52) U.S. Cl. ................ 429/174; 429/161; 429/175; 429/181
(58) Field of Classification Search ............ 429/174, 429/175, 161, 181
See application file for complete search history.

(56) References Cited

U.S. PATENT DOCUMENTS

| 6,432,575 | B1 * | 8/2002 | Yamagami | .......... 429/100 |
| 2002/0071986 | A1 * | 6/2002 | Exnar | .......... 429/94 |
| 2005/0106454 | A1 | 5/2005 | Kozu et al. | |
| 2006/0083982 | A1 * | 4/2006 | Jung et al. | .......... 429/164 |

FOREIGN PATENT DOCUMENTS

| JP | 07-220716 | 8/1995 |
| KR | 2003-53600 | 7/2003 |
| KR | 2003-66243 | 8/2003 |
| KR | 10-571247 | 4/2006 |
| KR | 10-601513 | 7/2006 |
| WO | WO 03/069698 | 8/2003 |

OTHER PUBLICATIONS

English Abstract for Korean Patent Publication No. 2006-29750.
U.S. Appl. No. 11/250,619, filed Oct. 17, 2005, Sang-Sok Jung et al., Samsung SDI Co., Ltd.

* cited by examiner

Primary Examiner—Dah-Wei D Yuan
Assistant Examiner—Patricia Davis
(74) Attorney, Agent, or Firm—Stein McEwen, LLP

(57) ABSTRACT

A lithium ion secondary battery in which at least one step portion is formed on an upper surface of a cap plate, and at least one step portion is formed on a lower or first surface of a battery part opposite to the upper or first surface of the cap plate so that the at least two step portions are complementary. The complementary step portions of the cap plate of the bare cell and the battery part provided at an upper part of the cap plate result in easy coupling of the battery part to the bare cell and stable maintenance of the coupling between the battery part and the bare cell. The coupling structure results in greater ease in performing subsequent manufacturing processes and protects the bare cells coupled to the battery part from dislodging.

17 Claims, 4 Drawing Sheets

LITHIUM ION SECONDARY BATTERY

CROSS-REFERENCE TO RELATED APPLICATIONS

This application claims priority to and the benefit of Korean Application No. 2006-19431, filed Feb. 28, 2006, in the Korean Intellectual Property Office, the disclosure of which is incorporated herein by reference.

BACKGROUND OF THE INVENTION

1. Field of the Invention

Aspects of the present invention relate to a lithium ion secondary battery, and more particularly, to a lithium ion secondary battery in which a separate battery part is coupled to an upper or first part of a cap plate of a bare cell.

2. Description of the Related Art

In general, primary batteries are not rechargeable, and secondary batteries are rechargeable. In recent years, for example, nickel-metal hydride (Ni-MH) batteries, lithium (Li) batteries, and lithium ion (Li-ion) batteries have been mainly used as the secondary batteries.

The lithium ion batteries are manufactured in various shapes. For example, the shapes of the lithium ion batteries may be classified into cylindrical, square prismatic, or pouch shapes according to the type of case used in manufacturing.

In the lithium ion battery, a carbon-based electrode is generally used as a cathode in order to reduce the risk of combustion or explosion. However, special emphasis is placed on the safety of the lithium ion battery in the manufacturing process due to the high energy density of lithium and the possibility of combustion reactions occurring with a non-aqueous electrolyte.

In order to improve the safety, the lithium ion battery generally includes a bare cell having a basic structure for charge or discharge and a protective circuit or a protective device for preventing overcharge, overdischarge, overheating, and overcurrent. The protective circuit or the protective device may be physically and electrically connected to the bare cell in the form of a printed circuit board and may be displaced on the side, the upper surface, or the lower surface of the bare cell.

In the cylindrical can battery, a cap assembly of a bare cell serves to prevent overheating and overcurrent. However, in the prismatic can battery, a cap assembly does not have such a safety feature. Therefore, in the prismatic can battery, particularly, a separate safety device should be coupled to the bare cell. In recent years, in many cases, the safety device of the prismatic can battery, such as a protective circuit board, is coupled to the upper surface of a cap plate.

Meanwhile, in a pack battery having a plurality of bare cells connected to one another, a battery part, such as a cap cover, may be coupled to an upper part of a cap plate in order for series/parallel connection of the bare cells in the pack or connection between the bare cells and a protective circuit.

An example of the cap cover will be described below. A peripheral portion or a body of the cap cover is generally formed of an insulating resin material, and forms a coupling part that is supported by a cap assembly of a bare cell while physically contacting the bare cell. A metal plate terminal that has a relatively narrow width and is connected to an electrode terminal of the bare cell is formed at the center of the lower surface of the cap cover. The narrow metal plate terminal is exposed through a hole formed in the center of the body of the cap cover. A wide metal plate terminal connected to a protective circuit terminal outside the bare cell may be provided in the vicinity of the hole on the upper surface of the cap cover. In addition, a conductive connecting part for connecting these metal plate terminals is provided.

However, in the cap assembly at the upper part of the bare cell, an electrode terminal protrudes from the surface of the cap plate and is insulated therefrom. Therefore, it is difficult to stably couple a battery part, such as a cap cover, to an upper part of the cap assembly. Further, it is difficult to stably couple the battery part to the bare cell by, for example, welding.

As a member for guiding the battery part to an accurate position with respect to the cell is not formed in the peripheral portion of the cap assembly, it is difficult to accurately couple the battery part to the upper part of the cap assembly. When the battery part is not accurately coupled to the cap assembly, it is difficult to achieve stable electrical connection between the battery part and the bare cell, which may cause defects in the electrical connection.

For example, when the cap cover is used for a pack battery, the cap cover should be fixed to the upper part of the cap plate. However, it is difficult to easily fix the cap cover to the cap plate, which may frustrate the manufacture of the pack battery.

SUMMARY OF THE INVENTION

Accordingly, aspects of the present invention have been contrived to solve the above-described drawbacks, and aspects of the present invention provide a lithium ion secondary battery having a structure capable of stably placing a battery part, such as a cap cover or a protective circuit assembly, on an upper part of a cap assembly.

According to an aspect of the invention, a lithium ion secondary battery includes: a bare cell including an electrode assembly having a first electrode, a second electrode, and a separator interposed between the first electrode and the second electrode, a can housing the electrode assembly, and a cap assembly that includes a cap plate coupled to an upper open part of the can and an electrode terminal formed in a through hole of the cap plate so as to be insulated from the through hole; and a battery part coupled to an upper part of the cap assembly of the bare cell. In the lithium ion secondary battery, step portions or step structures are formed on the battery part and the cap plate so as to correspond to each other.

According to another aspect of the invention, a lithium ion secondary battery includes: an electrode assembly having a first electrode, a second electrode, and a separator interposed between the first electrode and the second electrode; a can housing the electrode assembly; and a cap assembly that includes a cap plate coupled to an upper open part of the can and an electrode terminal formed in a through hole of the cap plate so as to be insulated from the through hole. In the lithium ion secondary battery, a step portion is formed on the upper surface of the cap plate.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
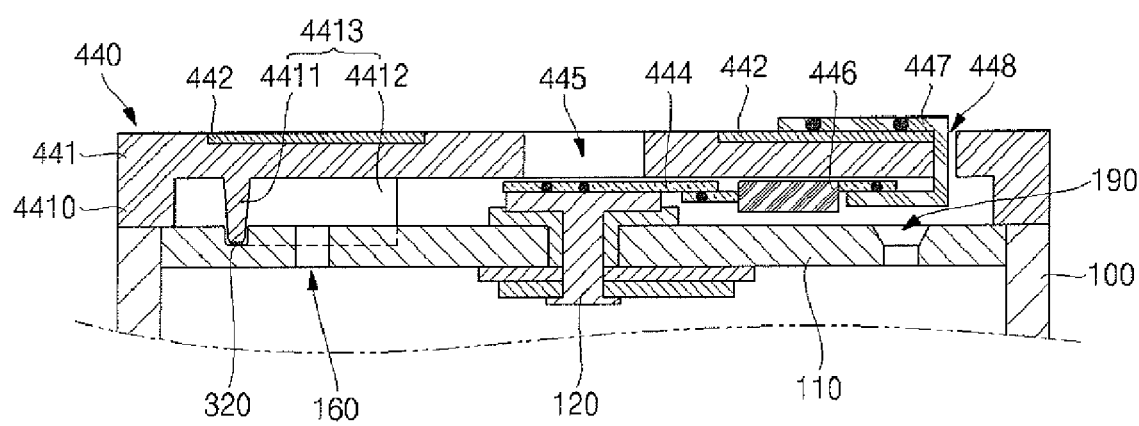
FIG. 1 is a cross-sectional view illustrating a cap cover, serving as a battery part, coupled to an upper part of a cap assembly of a square-shaped bare cell.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a partial cross-sectional view illustrating a square-shaped bare cell coupled to a cap cover according to aspects of the invention. Specifically, FIG. 1 is a cross-sectional view illustrating a necessary portion of the square-shaped bare cell coupled to the cap cover.

As shown in FIG. 1, the square-shaped bare cell, which comprises at least a cap plate 110 and a can 100, and the cap cover 440 coupled to each other may be provided in a battery pack in the same manner as cylindrical bare cells are connected in series/parallel to one another in a general battery pack and are connected to a protective circuit module.

The connection between the square-shaped bare cell and the cap cover 440 will be described in detail below with reference to FIG. 1. As shown in FIG. 1, a cap cover 440, also referred to as a battery part, is generally formed of a resin mold shape by insert injection molding and includes lead plates as electrical terminals formed of nickel.

The battery part may be a protective circuit board or the cap cover 440 coupled to a plurality of prismatic can batteries to form a pack battery. In this case, the cap cover 440 can be considered as a connecting part for electrical connection. However, generally, the cap cover 440 may serve as a safety device having a protective element, such as a PTC element 446, provided therein. The cap cover 440 may be formed in various shapes according to the type of connection among batteries.

The lead plates include a first lead plate 444 and a second lead plate 442. The first lead plate 444 is directly connected to a cathode terminal 120 of the square-shaped bare cell, which is provided at the center of the bare cell. And, a second lead plate 442 provided on the outer surface of the cap cover 440. After the cap cover 440 is formed, the first lead plate 444 is welded to one terminal of a positive temperature coefficient (PTC) element 446. And, the other terminal of the PTC element 446 is welded to one end of a connecting plate 447. The connecting plate 447 electrically connects the PCT element 446 to the second lead plate 442 on the outer surface of the cap cover 440 via a through hole 448. Thus, the second lead plate 442 is electrically connected to the cathode terminal 120 via the connecting plate 447, the PTC element 446, and the first lead plate 444.

The cap cover 440, or battery part, is placed over a cap plate 110 of the square-shaped bare cell. The PTC element 446 is coupled to the internal surface of the cap cover 440. In this case, a peripheral rib 4410 extending from a peripheral portion of a plate body 441 of the cap cover 440 toward the cap plate 110 is aligned with the side wall of a can 100.

A U-shaped position fixing rib 4413 and a complementary position fixing groove 320 are provided and collectively referred to as step portions. A step portion will generally have a rib or groove shape and have a corresponding groove or rib shape with which to couple. An end of a U-shaped position fixing rib 4413 is inserted into a position fixing groove 320 formed in the upper or first surface of the cap plate 440. The U-shaped position fixing rib 4413 may be formed closer to the cathode terminal 120 than to the peripheral rib 4410. In FIG. 1, a first portion 4411 is a cross section of a wall when the U-shaped position fixing rib 4413 is symmetrically cut in the vertical direction. And, a second portion 4412 is a side wall portion of the position fixing rib 4413 and is connected to the cross section of the wall.

In this way, the cap cover 440 is fixed relative to the cap plate 110, and the connection between the cap cover 440 and the cap plate 110 is kept in a stable state. However, other configurations are possible, such as having a protrusion formed in the cap plate 110 that extends to insert into a groove formed in the cap cover 440.

The first lead plate 444 formed on the inner surface of the cap cover 440 is welded to the cathode terminal 120. Here, a welding rod may be inserted through a hole 445 formed in the center of the cap cover 440.

When the welding is completed, a plurality of square-shaped bare cells coupled to the cap cover 440 are thereby connected in series or parallel to one another in a battery pack and connected to the cap cover 440, which is a protective circuit module, through separate connecting conductors. The connection of a plurality of bare cells forms a pack-type battery.

The complementary corresponding step portions of the cap cover 440 and the cap plate 110 can be easily connected to each other, which makes it possible to easily perform a process of physically coupling the cap cover 440 to the bare cell and to easily progress a subsequent process, such as a welding process. In addition, the complementary corresponding step portions, the fixing rib 4413 and the groove 320, make it possible to stabilize the connection between the bare cell and the cap cover 440 in the battery pack. As such, a plurality of bare cells may be stably contained in a battery pack.

As illustrated, a groove 320 is formed in the upper or first surface of the cap plate 110, and a protruding step portion, such as the rib 4413, is formed on the lower or first surface of the plate body 441 of the cap cover 440. However, a protrusion may be formed on the upper or first surface of the cap plate 110, and a groove may be formed in the plate body 441 of the cap cover 440.

For example, when the groove 320 is formed in the upper or first surface of the cap plate 110, a protruding portion, the fixing rib 4413, that is inserted into the groove 320 is formed on the lower or first surface of the battery part, or the cap cover 440. Or oppositely, when a fixing rib is formed at the center of the cap plate, a groove is formed on the lower or first surface of the battery part so as to correspond to and accept the fixing rib of the cap plate when the battery part and the cap plate are coupled. The battery part is kept at a fixed position with regard to the bare cell without being detached from the bare cell even when an external force is applied to the battery part or the bare cells. Furthermore, the cap cover 440 and the cap plate 110 need not only include grooves or ribs, but may contain a combination of both grooves and ribs.

The fixing rib 4413 may be formed in the lower or first surface of the cap cover 440, but the shape of the step portions is not limited thereto. That is, the position and size of the step portions may vary according to the type of battery part coupled to the cap plate 110. The height of the fixing rib 4413 or depth of the groove 320 may range from 10% to 50% of the thickness of the cap plate 110. For example, when the thickness of the cap plate is about 0.8 mm, the height of the fixing rib 4413 and the depth of the groove 320 may be in the range of 0.1 to 0.4 mm. When the height of the fixing rib 4413 or the depth of the groove 320 is small, it is difficult for the fixing rib 4413 to maintain connection with the groove 320. On the other hand, when the height of the fixing rib 4413 or depth of the groove 320 is large, it is difficult to form the fixing rib 4413. Also, the larger the depth of the groove 320, the smaller the thickness of a portion of the cap plate 110 corresponding to the groove 320 becomes, which may cause damage to or deform the cap plate 110.

In a process of forming the cap plate 110, the step portions, be they grooves or protrusions, may be formed, for example, by injection molding, pressing, casting, or die casting. A protrusion having a small height may be formed on only the upper or first surface of the cap plate 110 by pressing. In addition, the step portions may be formed on the upper, or first, and lower, or second, surface of the cap plate 110 in a complementary structure. For example, a protrusion may be formed on the upper or first surface of the cap plate 110 and a groove may be formed in the lower or second surface of the cap plate 110 as illustrated in FIG. 2B. As a result, the sectional structure of the step portions may be conformal.

When casting is used, a protrusion may be formed in a rib shape on only the upper or first surface of the cap plate 110, and the lower or second surface of the cap plate 110 may be formed flat. A step portion having a rib shape may be adhered or welded to the upper or first surface of the cap plate 110. As the height or depth of the step portions becomes larger and the edges of the step portions are vertically formed without being chamfered, the risk of the battery part, here—the cap cover 440, being detached from the cap plate 110 is reduced.

Figure 2A:
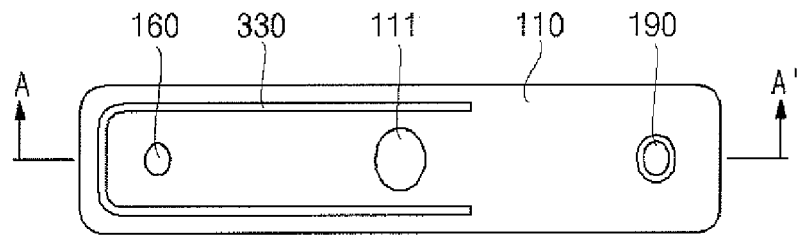
FIG. 2A is a plan view illustrating a cap plate according to another embodiment of the invention.
Figure 2B:
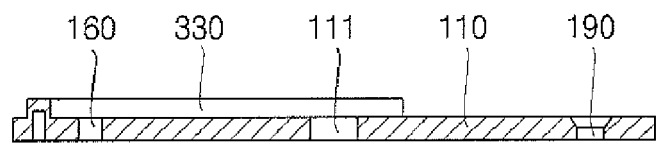
FIG. 2B is a cross-sectional view illustrating the cap plate of FIG. 2A.
Figure 3:
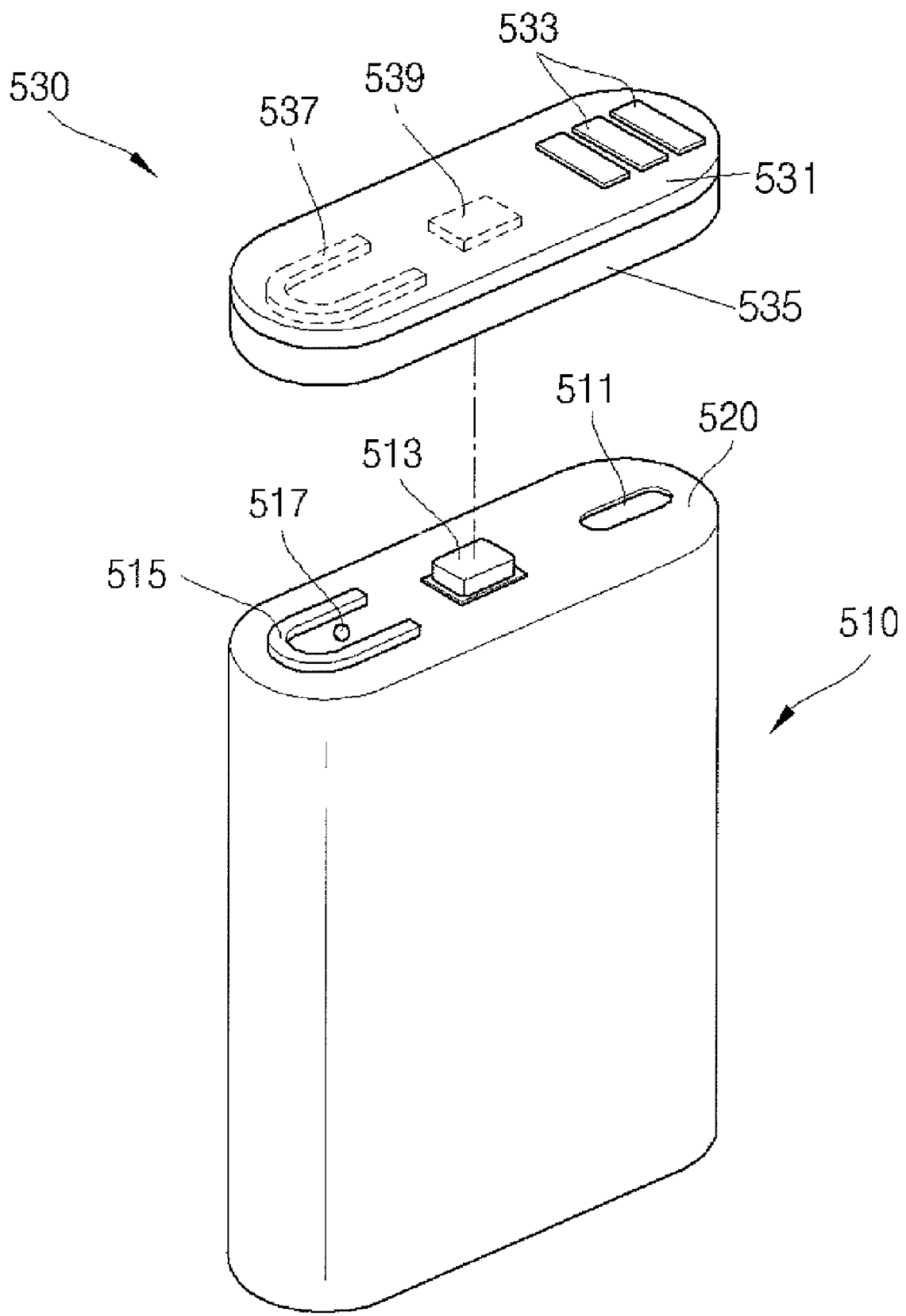
FIG. 3 is a perspective view schematically illustrating the coupling between a protective circuit assembly and a bare cell according to another embodiment of the invention.

FIG. 2A is a plan view illustrating a cap plate according to aspects of the invention, and FIG. 2B is a cross-sectional view illustrating a cross section A-A' of the cap plate of FIG. 2A. FIG. 3 is a perspective view illustrating the coupling between a protective circuit assembly and a bare cell according to another aspect of the invention.

Referring to FIG. 2A, a cap plate 110 has a fixing rib 330 formed thereon and the fixing rib 330 is formed in a "U" shape on the outer surface of the cap plate 110. The fixing rib 330 corresponds to the U-shaped fixing rib 4413 of FIG. 1 but is formed on the cap plate 110. The fixing rib 330 extends to insert into a groove of the cap cover (not shown) so as to stabilize the coupling of the bare cell to the cap cover. The electrolyte injection hole 160, the vent 190, and a cathode through-hole 111 are formed to extend through the cap plate 110. During the assembly of the bare cells, electrolyte is injected through the electrolyte injection hole 160. Also, the cathode through-hole 111 allows the cathode terminal 120 to extend through the cap plate 110. Referring to FIG. 2B, the fixing rib 330 is formed by pressing. The electrolyte injection hole 160, the vent 190, and the cathode through hole 111 extend through the cap plate 110. The fixing rib 330 extends from and is an elevated portion above the outer surface of the cap plate 110. The fixing rib 330 and the corresponding groove formed in a battery part (not shown) are step portions.

Referring to FIG. 3, a U-shaped groove 537 is formed on the lower or first surface of a protective circuit assembly 530, which serves as a battery part. The U-shaped groove 537 is formed to correspond to a U-shaped fixing rib 515 formed on a cap plate 520. The U-shaped groove 537 is formed to accept the insertion of the U-shaped fixing rib 515 formed on the outer surface of the cap plate 520. As such, the U-shaped fixing rib 515 is formed to a size slightly smaller than that of the U-shaped groove 537, and the U-shaped fixing rib 515 is inwardly inserted to the U-shaped groove 537. In this case, the fixing rib 515 enables a battery part, such as the protective circuit assembly 530, to be stably coupled to the cap plate 520. The fixing rib 515 serves to prevent the battery part from deviating from a fixed position on the protective circuit assembly 530 due to external forces. The height to which the fixing rib 515 extends above the outer surface of the cap plate 520 and the depth to which the groove 537 is formed in the plate body 531 provide a predetermined space between the plate body 531 and the cap plate 520. The protective circuit assembly 530 may be formed of molded plastic and be formed to include an external connection electrode 533. In the protective circuit assembly 530, an anode terminal may be formed of the U-shaped fixing rib 515 and groove 537. An edge skirt 535, formed of plastic, protrudes downward from the lower or first surface of a plate body 531, also formed of a plastic resin, to surround the protective circuit assembly 530. The edge skirt 535 may be formed of or coated with a conductive material to be included as an element of the anode terminal.

The depth to which a cathode terminal acceptor 539 of the protective circuit assembly 530 extends, and the extent to which a cathode terminal 513 extends above the cap plate 520 of the bare cell 510 may be determined by considering the height of the U-shaped fixing rib 515, the depth of the U-shaped groove 537, and the length of the edge skirt 535. For example, the cathode terminal acceptor 539 may be formed at the center of the lower or first surface of the plate body 531 of the protective circuit assembly 530, and the height of the anode terminal composed of the U-shaped groove 537, the U-shaped fixing rib 515 of the cap plate 520, and the edge skirt 535 may be equal to the height to which the cathode terminal 513 extends above the cap plate 520. The polarities of the anode terminal and the cathode terminal 513 may be switched.

The cathode terminal 513 of the bare cell, the cathode terminal acceptor 539, contact portions of the U-shaped groove 537 and the fixing rib 515, and the edge skirt 535 may be plated with gold or another conductive metal. Instead of a conductive metal, the cathode terminal 513 of the bare cell, the cathode terminal acceptor 539, the contact portions of the U-shaped groove 537 and the fixing rib 515, and the edge skirt 535 may be coated with a conductive adhesive, such as silver paste. The conductive adhesive generally reduces a contact resistance and has a high adhesive strength. Or, a medium layer structure may be formed to reduce the contact resistance between the fixing rib 515 and the groove 537, or any of the other contact portions. Then, the protective circuit assembly 530 is coupled to the bare cell 510 through these processes, or a combination thereof, to form a simple pack battery.

A wrapping material (not shown) may be additionally provided on the assembly of the bare cells and the protective circuit, or the bare cells may be individually wrapped. Tubing may be used as a wrapping material.

Figure 4A:
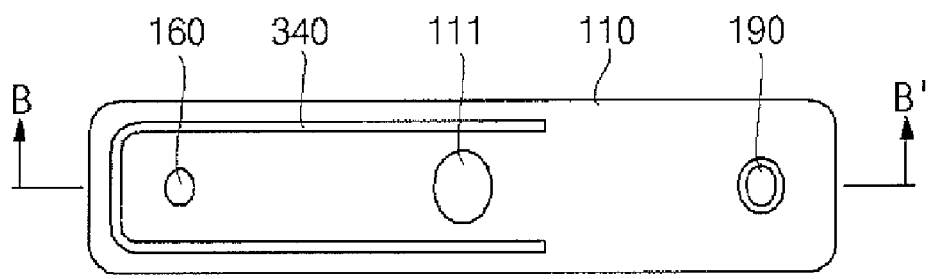
FIG. 4A is a plan view illustrating a cap plate according to another embodiment of the invention.
Figure 4B:
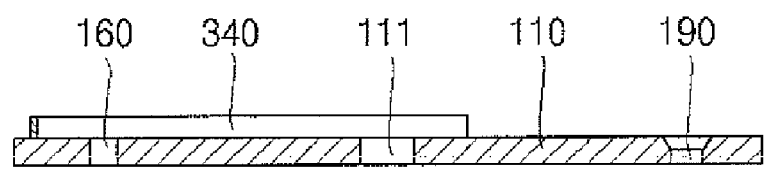
FIG. 4B is a cross-sectional view illustrating the cap plate of FIG. 4A.

FIG. 4A is a plan view illustrating a cap plate according to aspects of the invention, and FIG. 4B is a cross-sectional view illustrating a cross section B-B' of the cap plate of FIG. 4A.

Referring to FIGS. 4A and 4B, a fixing rib 340 is formed in a "U" shape on the outer surface of the cap plate 110, and the fixing rib 340 is adhered to an upper part of the cap plate 110. It is possible to easily form the fixing rib 340 by fixing a member to the upper part of the cap plate 110 with an adhesive without pressing the cap plate 110. FIGS. 4A and 4B also include the electrolyte injection hole 160, the vent 190, and the cathode through-hole 111, which both extend through the cap plate 110. The fixing rib 340 and the corresponding groove formed in a battery part (not shown) are step portions.

Figure 5:
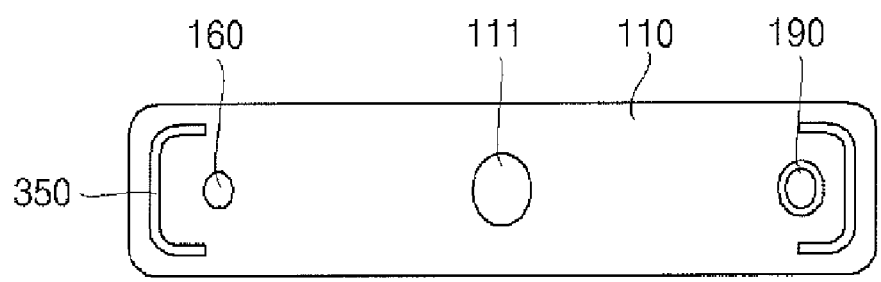
FIG. 5 is a plan view illustrating a cap plate according to another embodiment of the invention.

FIG. 5 is a plan view illustrating a cap plated according to aspects of the invention.

Referring to FIG. 5, fixing ribs 350 are formed in U shapes on both sides of the upper or first surface of the cap plate 110 in the lateral direction. The fixing ribs 350 enable a battery part, including structures corresponding to the fixing ribs 350 on the lower or first surface thereof, to be stably coupled to the upper part of a cap assembly 100 without leaning to one side. The cap plate 110 includes the electrolyte injection hole 160, the vent 190, and the cathode through-hole 111. The fixing ribs 350 and the corresponding grooves formed in a battery part (not shown) are step portions.

Figure 6:
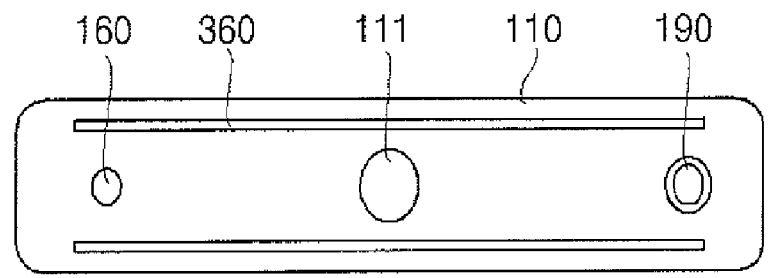
FIG. 6 is a plan view illustrating a cap plate according to another embodiment of the invention.

FIG. 6 is a plan view illustrating a cap plate according to aspects of the invention.

Referring to FIG. 6, fixing ribs 360 are formed in linear shapes along both long sides of a cap plate 110. The fixing ribs 360 of the cap plate 110 make it possible to increase the stability of the coupling between the battery part and the cap plate 110. The cap plate 110 includes the electrolyte injection hole 160, the vent 190, and the cathode through-hole 111. The fixing ribs 360 and the corresponding grooves formed in a battery part (not shown) are step portions.

Figure 7:
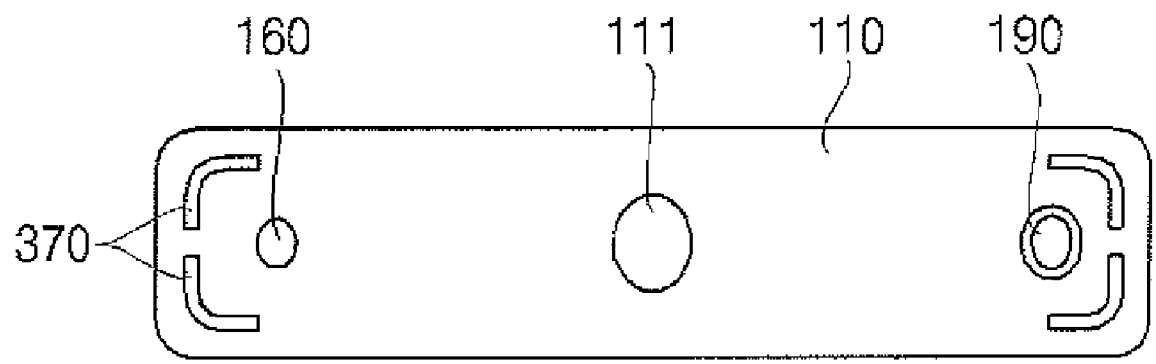
FIG. 7 is a plan view illustrating a cap plate according to another embodiment of the invention.

FIG. 7 is a plan view illustrating a cap plate according to aspects of the invention.

Referring to FIG. 7, fixing ribs 370 are formed in "L" shapes at the four corners of a cap plate 110.

The fixing ribs 370 may be formed on the cap plate 110 by pressing the cap plate to form the fixing ribs 370 with a predetermined shape or by adhering a member of a predetermined shape to the cap plate 110. The fixing ribs 370, as described above, provide a space to be formed between a battery part and the cap plate 110. The space above the cap plate 110 is pressurized so as to prevent an electrolyte from leaking from the electrolyte injection hole 160. The cap plate 110 also includes the vent 190. The fixing ribs 370 and the corresponding grooves formed in a battery part (not shown) are step portions.

According to aspects of the invention, complementary corresponding step portions are formed between a cap plate of a bare cell and a battery part provided at the upper part of the cap plate, which makes it possible to easily couple the battery part to the bare cell, or a plurality of bare cells, and thus to easily perform subsequent manufacturing processes, such as welding.

Further, according to the aspects of the invention, the coupling between the bare cell and the battery part is reliably maintained, which makes it possible to reduce defects in connection due to external impact.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lithium ion secondary battery comprising:
    an electrode assembly including a first electrode, a second electrode, and a separator interposed between the first electrode and the second electrode;
    a can to house the electrode assembly;
    a cap assembly that includes a cap plate and an electrode terminal insulated from the cap plate and is coupled to the can to close an open part of the can; and
    a cap cover coupled to the cap assembly, the cap cover comprising:
        a plate body that has at least one through hole and a step portion formed on a first surface of the plate body;
        a first lead plate that is formed on the first surface of the plate body opposite the cap plate and is connected to the electrode terminal;
        a second lead plate that is formed on a second surface of the plate body and is connected to external terminals, and
        a connecting conductor that extends through the through hole to connect the first lead plate and the second lead plate,
    wherein step portions are oppositely formed on a surface of the cap cover and on a first surface of the cap plate and are engaged with each other.

2. The lithium ion secondary battery as claimed in claim 1, wherein the step portion is formed on the first surface of the cap plate by pressing so that a complementary step portion corresponding to the step portion on the first surface of the cap plate is formed on a second surface of the cap plate opposite the first surface of the cap plate.

3. The lithium ion secondary battery as claimed in claim 1, wherein the step portion is formed on the first surface of the cap plate by casting or die casting, and
    a second surface opposite the first surface of the cap plate is flat at a position in which the step portion is formed.

4. The lithium ion secondary battery as claimed in claim 1, wherein the step portion is formed by adhering a member having a predetermined shape to the first surface of the cap plate.

5. The lithium ion secondary battery as claimed in claim 1, wherein the step portion protrudes from the first surface of the cap plate to the same height as that of the electrode terminal.

6. The lithium ion secondary battery as claimed in claim 1, wherein the step portion is an electrode terminal having a polarity different from that of the electrode terminal and is coupled to the step portion of the cap cover.

7. The lithium ion secondary battery as claimed in claim 1, further comprising:
    a medium layer structure to reduce contact resistance and formed in a portion in which the step portion of the cap plate and the step portion of the cap cover are engaged.

8. The lithium ion secondary battery as claimed in claim 1, wherein the step portion of the cap plate is formed in a "U" shape in a peripheral portion of the cap plate.

9. The lithium ion secondary battery as claimed in claim 1, wherein the step portions of the cap plate are formed in "U" shapes on the first surface of the cap plate.

10. The lithium ion secondary battery as claimed in claim 1, wherein the step portions of the cap plate are formed in linear shapes on the first surface of the cap plate.

11. The lithium ion secondary battery as claimed in claim 1, wherein the step portions of the cap plate are formed in an "L" shape in at least one of four corners on the first surface of the cap plate.

12. The lithium ion secondary battery as claimed in claim 1,
wherein the connecting conductor includes a positive temperature coefficient (PTC) element.

13. The lithium ion secondary battery as claimed in claim 1,
wherein the step portion formed on the first surface of the plate body comprises a rib protruding from the first surface of the plate body, and
the step portion formed on the first surface of the cap plate comprises a groove into which the rib is inserted.

14. The lithium ion secondary battery as claimed in claim 1,
wherein the first and second lead plates are integrally formed with the plate body by insert injection molding.

15. A lithium ion secondary battery, comprising:
at least one cap assembly, which includes a cap plate connectable to at least one bare cell; and
a battery part connectable to the at least one cap assembly, the battery part comprising:
a plate body that has at least one through hole and a step portion formed on a first surface of the plate body;
a first lead plate that is formed on the first surface of the plate body opposite the cap plate and is connected to the electrode terminal;
a second lead plate that is formed on a second surface of the plate body and is connected to external terminals, and
a connecting conductor that extends through the through hole to connect the first lead plate and the second lead plate,
wherein the at least one cap assembly has at least one fixing rib and/or at least one groove formed on the cap plate, and the battery part has a corresponding structure for each of the at least one cap assemblies to engage the at least one fixing rib and/or the at least one groove formed on the cap plate.

16. The secondary battery of claim 15, wherein the battery part is a protective circuit assembly.

17. The secondary battery of claim 15, wherein the at least one cap assembly is a plural number of cap assemblies including the plural number of cap plates connectable to the plural number of bare cells.

* * * * *